(12) United States Patent
Noda

(10) Patent No.: US 7,283,163 B1
(45) Date of Patent: Oct. 16, 2007

(54) IMAGE PROCESSING APPARATUS PROVIDING NOISE CORRECTION

(75) Inventor: Hiroshi Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/400,549

(22) Filed: Sep. 21, 1999

(30) Foreign Application Priority Data

Sep. 24, 1998 (JP) ................................. 10-269656

(51) Int. Cl.
*H04N 9/64* (2006.01)
(52) U.S. Cl. ...................................................... 348/243
(58) Field of Classification Search ................. 396/79, 396/80, 96, 121, 123; 348/241, 243, 345, 348/348, 349, 350, 308
See application file for complete search history.

(56) References Cited

U.S. PATENT DOCUMENTS

| | | | | |
|---|---|---|---|---|
| 4,839,729 A * | 6/1989 | Ando et al. | ................... | 348/241 |
| 5,515,102 A * | 5/1996 | Pearsall et al. | .............. | 348/241 |
| 5,521,639 A * | 5/1996 | Tomura et al. | .............. | 348/243 |
| 5,729,288 A | 3/1998 | Saito | ........................... | 348/243 |
| 5,818,898 A | 10/1998 | Tsukamoto et al. | ........ | 378/98.8 |
| 5,943,094 A * | 8/1999 | Sakai et al. | ................... | 348/243 |
| 6,130,712 A * | 10/2000 | Miyazaki et al. | ............ | 348/243 |
| 6,133,862 A * | 10/2000 | Dhuse et al. | ................ | 341/118 |
| 6,137,535 A * | 10/2000 | Meyers | ........................ | 348/340 |
| 6,144,408 A * | 11/2000 | MacLean | ..................... | 348/241 |
| 6,154,253 A * | 11/2000 | Kiri et al. | .................... | 348/345 |
| 6,473,124 B1 * | 10/2002 | Panicacci et al. | ............ | 348/241 |
| 6,563,536 B1 * | 5/2003 | Rashkovskiy et al. | ....... | 348/243 |

FOREIGN PATENT DOCUMENTS

| | | |
|---|---|---|
| JP | 6253217 | 9/1994 |
| JP | 08-51571 | 2/1996 |
| JP | 08-275064 | 10/1996 |
| JP | 09-23358 | 1/1997 |
| JP | 9026540 | 1/1997 |
| JP | 09-83840 | 3/1997 |
| JP | 09-131337 | 5/1997 |
| JP | 09-181977 | 7/1997 |
| JP | 10-190038 | 7/1998 |
| JP | 10-208016 | 8/1998 |

* cited by examiner

*Primary Examiner*—Lin Ye
*Assistant Examiner*—Justin P Misleh
(74) *Attorney, Agent, or Firm*—Fitzpatrick, Cella, Harper & Scinto

(57) ABSTRACT

In order to eliminate noises contained in signals output from a photoelectric conversion unit, an image processing apparatus is provided with a photoelectric conversion unit including a pixel and a noise correction unit for correcting noises in a signal output from a pixel in accordance with noise information obtained from the pixel during two or more arbitrary different accumulation times.

6 Claims, 14 Drawing Sheets

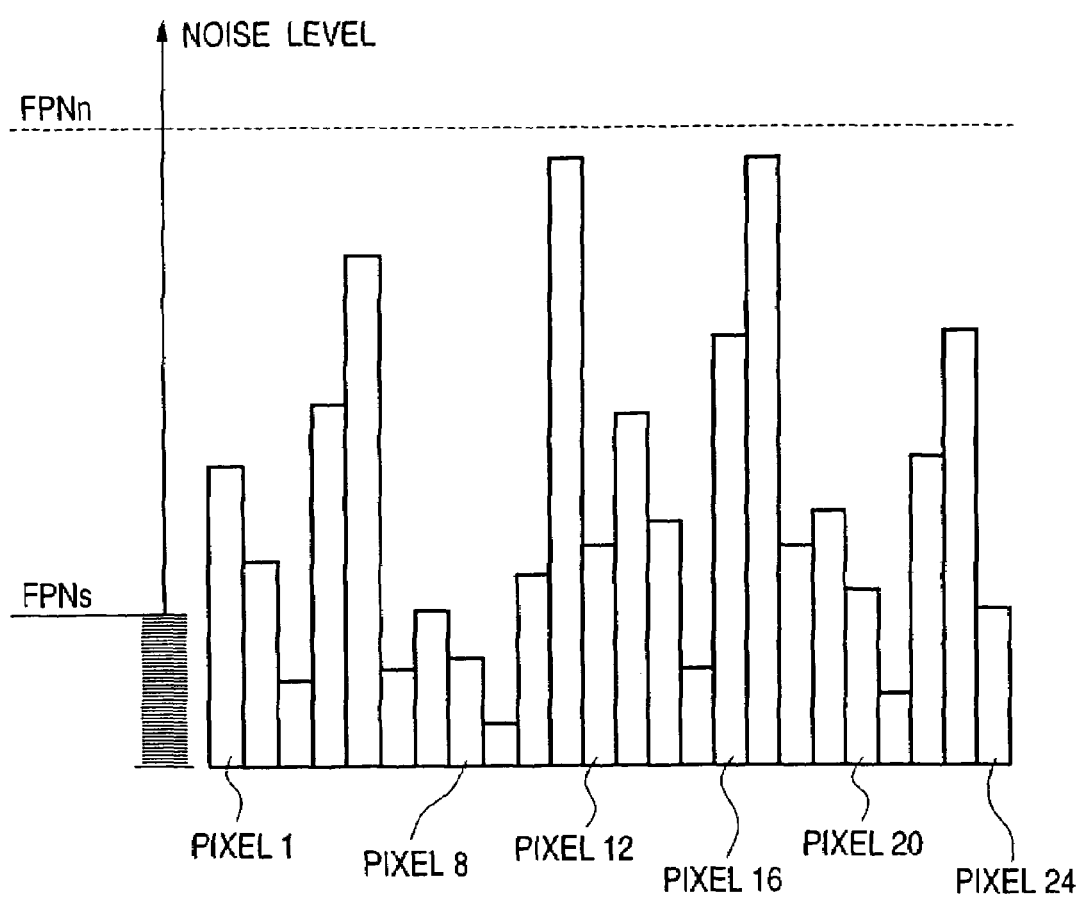

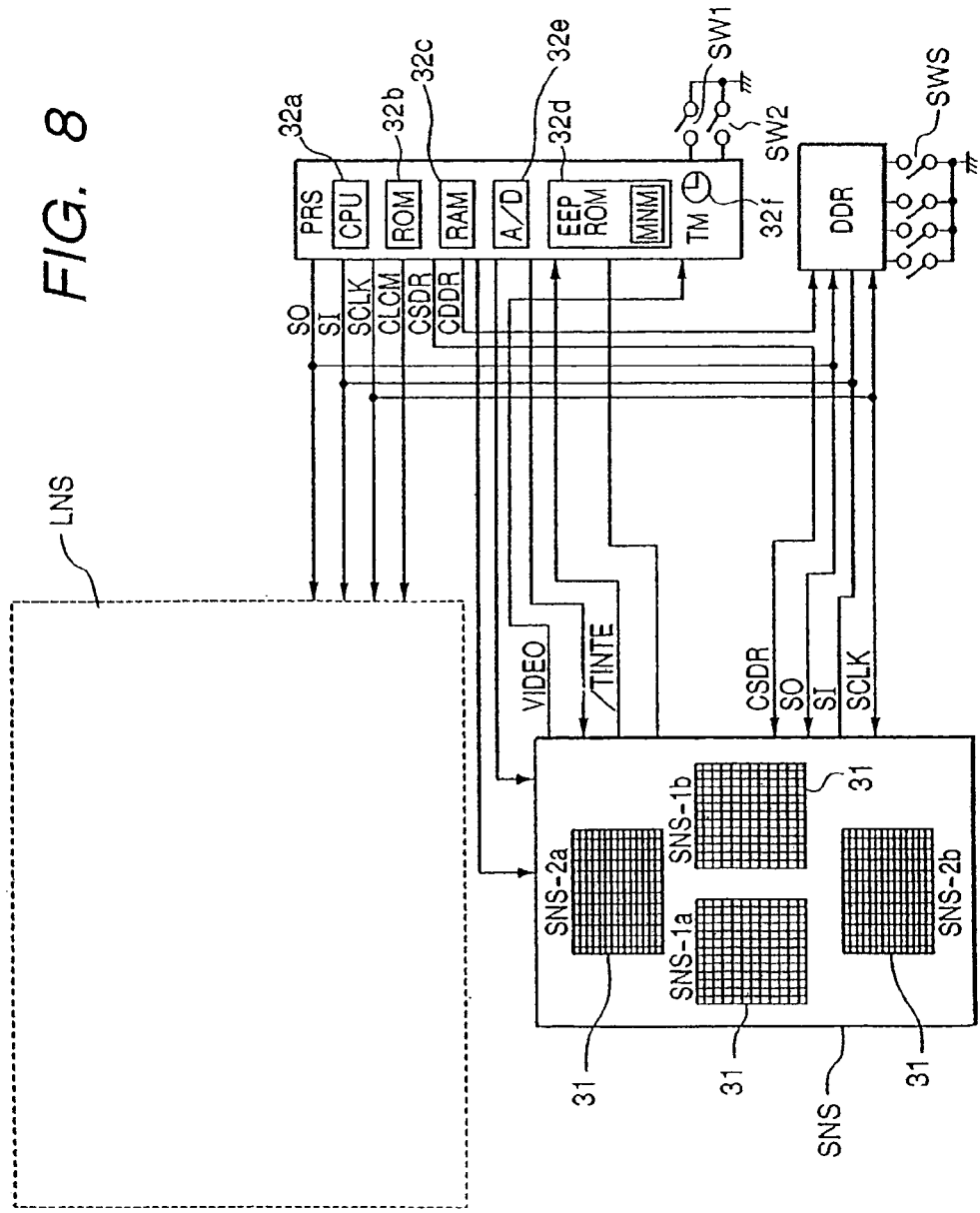

IMAGE PROCESSING APPARATUS PROVIDING NOISE CORRECTION

BACKGROUND OF THE INVENTION

1. Field of the Invention

The present invention relates to an image processing apparatus, an automatic focus detecting apparatus, a correction apparatus, a correction method, respectively capable of obtaining a highly precise signal, and to a storage medium storing a program realizing the functions of the apparatuses and method.

2. Related Background Art

Following conventional noise eliminating methods are known.

In an automatic focus detector of a camera or the like, a light beam becomes incident upon a distance measurement optical system and is focussed upon a photoelectric conversion unit with a plurality of line sensors. An output of the photoelectric conversion unit is supplied to a distance measurement unit (generally a microprocessor with a built-in input/output control program for the photoelectric conversion unit and a built-in focus detecting and calculating program) to obtain the focal point.

Noise correction methods for a photoelectric conversion unit usable with an automatic focus detector are described, for example, in Japanese Patent Application Laid-Open Nos. 9-26540 and 10-190038. According to Japanese Patent Application Laid-Open No. 9-26540, a dark current detector is provided for shading a partial area of each of CCD line sensors picking up different portions of an image of a subject to measure an amount of a dark current. The dark current of each line sensor is corrected in accordance with the light amount integration time (accumulation time). According to Japanese Patent Application Laid-Open No. 10-190038, a plurality of load MOS transistors is provided for each output line, the load MOS transistor determining the gain of electric charges of each pixel of an area sensor which charges are inversely amplified and stored. One of the load MOS transistors is selected which, together with a sensor amplifier MOS transistor, makes the fixed pattern noises smallest. In this manner, by devising hardware, the fixed pattern noises are reduced.

Noise elimination for a photoelectric conversion unit usable for picking up an image of a subject is disclosed in Japanese Patent Application Laid-Open No. 6-253217. During the operation of a photoelectric conversion unit, the state while a light beam is not incident and the state while a light beam is incident are alternately repeated. According to Japanese Patent Application Laid-Open No. 6-253217, during the state while a light beam is not incident upon the photoelectric conversion unit, an output of the unit is stored which is subtracted from an output while a light beam is incident. In this manner, dark current components are eliminated.

A dark current is an error signal proportional to the accumulation time and independent from an amount of incidence light upon a photoelectric conversion unit. Fixed pattern noises are noises specific to each pixel of a photoelectric conversion unit and independent from an incidence light amount and accumulation time. FIG. 1 is a schematic diagram showing how dark current and fixed pattern noises change with each pixel of a photoelectric conversion unit and an accumulation time.

Pixels 1 to n shown in FIG. 1 are the pixels of a photoelectric conversion unit. The abscissa represents an accumulation time, and the ordinate represents an error signal of the photoelectric conversion unit. The fixed pattern noise is constant irrespective of whether the accumulation time is long or short. The amplitude of the fixed pattern noise changes with each pixel. The dark current increases as the accumulation time becomes long. The amplitude of the dark current which increases in proportion to the accumulation time changes with each pixel. If the accumulation time is near 0, the dark current of each pixel becomes negligibly small.

FIG. 2 shows a relationship between levels of fixed pattern noises of respective pixels of the photoelectric conversion unit and a threshold level FPNs used as a criterion for judging a defect chip. If the fixed pattern noises are larger than FPNs, the error signal affects the image processing to be executed after the light exposure, and there is a possibility that an image taken with a camera under an AF operation becomes out of focus. A conventional focus detector selectively uses a photoelectric conversion unit having fixed pattern noises smaller than FPNs. Since a variation range of fixed pattern noises of pixels is small, it is sufficient for fixed pattern noise correction that each pixel train with a plurality of pixels of a photoelectric conversion unit is corrected by using the same correction value. For example, it is possible to presume that the fixed pattern noises of pixels shown in FIG. 1 are the same. Therefore, only the dark current is corrected by using different correction values for respective pixels.

Another example of a photoelectric conversion unit usable for taking an image of a subject is shown in FIG. 3. First, the circuit structure of the photoelectric conversion unit will be described. In FIG. 3, reference numeral 51 represents a pixel, reference numeral 52 represents a vertical scanning circuit, reference numeral 53 represents a capacitor for storing a signal combined with an optical signal and a noise signal of each pixel, reference numeral 54 represents a capacitor for storing a noise signal of each pixel, reference numerals 55 and 56 represent transfer MOS transistors for transferring a signal of each pixel to the capacitors 53 and 54, reference numerals 57 and 58 represent transfer MOS transistors for transferring signals stored in the capacitors 53 and 54 to horizontal output lines 59 and 60, reference numeral 61 represents a horizontal scanning circuit, and reference numeral 62 represents a differential amplifier for amplifying a difference between two signals.

Next, the operation of the photoelectric conversion unit will be descried. First, pixels are reset and a noise signal (N) after resetting is transferred to the capacitor 54. Next, the light exposure is performed so that the pixel has a signal combined with an optical signal (S) and a noise signal (N). This signal is transferred to the capacitor 57. The capacitor 57 stores signals S+N and the capacitor 58 stores the signal N. These signals are read to the horizontal output lines 59 and 60. Lastly, the differential amplifier circuit 62 outputs only the light signal S ((S+N)–N).

Such a noise elimination method is also applied to a photoelectric conversion unit with pixels arranged in one-dimension.

Although noises can be eliminated by the above-described methods, these methods may become unsatisfactory for obtaining a highly precise signal.

SUMMARY OF THE INVENTION

It is an object of the present invention to obtain a highly precise signal.

In order to achieve the above object, according to one aspect of the present invention, there is provided an image processing apparatus comprising: a photoelectric conversion unit including a pixel; and noise correction means for correcting noises in a signal output from the pixel in accordance with noise information obtained from the pixel during two or more arbitrary different accumulation times.

According to another aspect of the present invention, there is provided an image processing apparatus comprising: a photoelectric conversion unit including a plurality of pixels; storage means for storing noise information of the pixel independent from an accumulation time and noise information of the pixel dependent upon the accumulation time; and noise correction means for correcting noises in a signal output from the photoelectric conversion unit in accordance with the respective noise information stored in the storage means.

According to another aspect of the present invention, there is provided an automatic focus detecting apparatus comprising: a photoelectric conversion unit including a plurality of pixels; noise correction means for correcting noises in a signal output from the pixel in accordance with noise information of the pixel obtained during two or more arbitrary different accumulation times; and distance measurement calculation means for performing a distance measurement calculation in accordance with a signal corrected by the noise correction means.

According to another aspect of the present invention, there is provided an automatic focus detecting apparatus comprising: a photoelectric conversion unit including a plurality of pixels; storage means for storing noise information of a pixel independent from an accumulation time and noise information of a pixel dependent upon the accumulation time; noise correction means for correcting noises in a signal output from the photoelectric conversion unit in accordance with the respective noise information stored in the storage means; and distance measurement calculation means for performing a distance measurement calculation in accordance with a signal corrected by the noise correction means.

According to another aspect of the present invention, there is provided a correction apparatus comprising: noise correction means for correcting noises from a signal output from a pixel in a photoelectric conversion unit, in accordance with noise information of the pixel obtained during two or more arbitrary different accumulation times.

According to another aspect of the present invention, there is provided a correction method comprising the step of correcting noises from a signal output from a pixel in a photoelectric conversion unit, in accordance with noise information of the pixel obtained during two or more arbitrary different accumulation times.

According to another aspect of the present invention, there is provided a storage medium storing a program comprising the step of correcting noises from a signal output from a pixel in a photoelectric conversion unit, in accordance with noise information of the pixel obtained during two or more arbitrary different accumulation times.

BRIEF DESCRIPTION OF THE DRAWINGS

FIG. 5 is a graph showing an example of a variation in noise levels of a photoelectric conversion unit.

FIG. 8 is a circuit block diagram of a single-lens reflex camera.

DETAILED DESCRIPTION OF THE PREFERRED EMBODIMENTS

Figure 1:
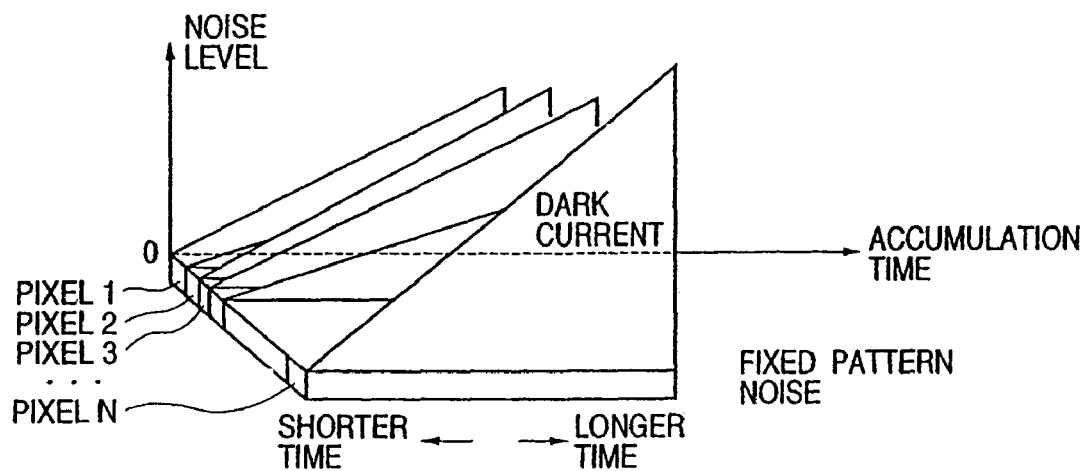
FIG. 1 is a schematic diagram showing a relation between fixed pattern noises, dark currents and accumulation time of pixels according to conventional techniques.
Figure 2:
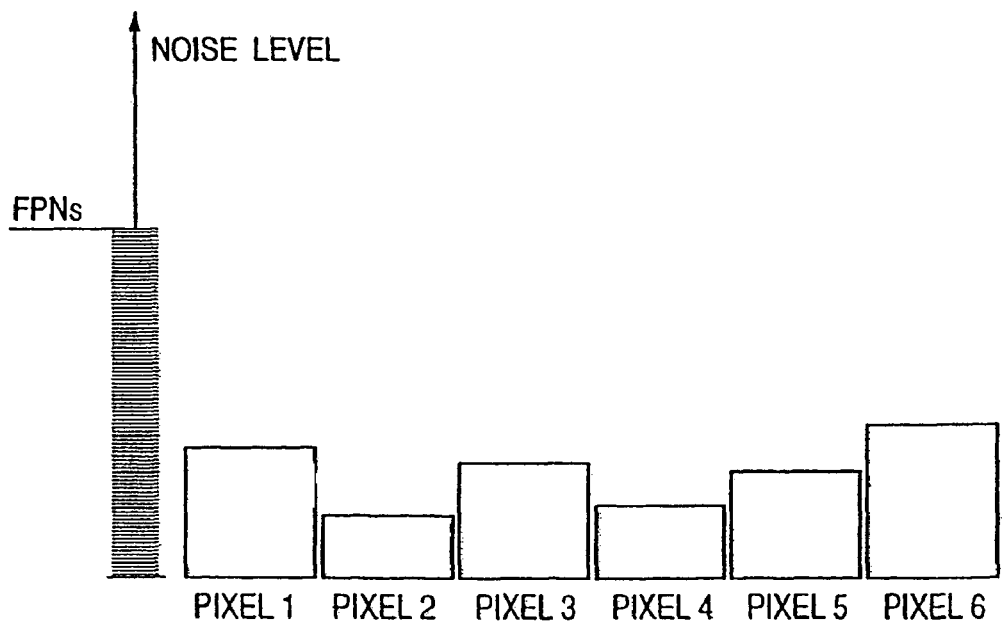
FIG. 2 is a graph showing an example of a variation in noise levels of a conventional photoelectric conversion unit.
Figure 3:
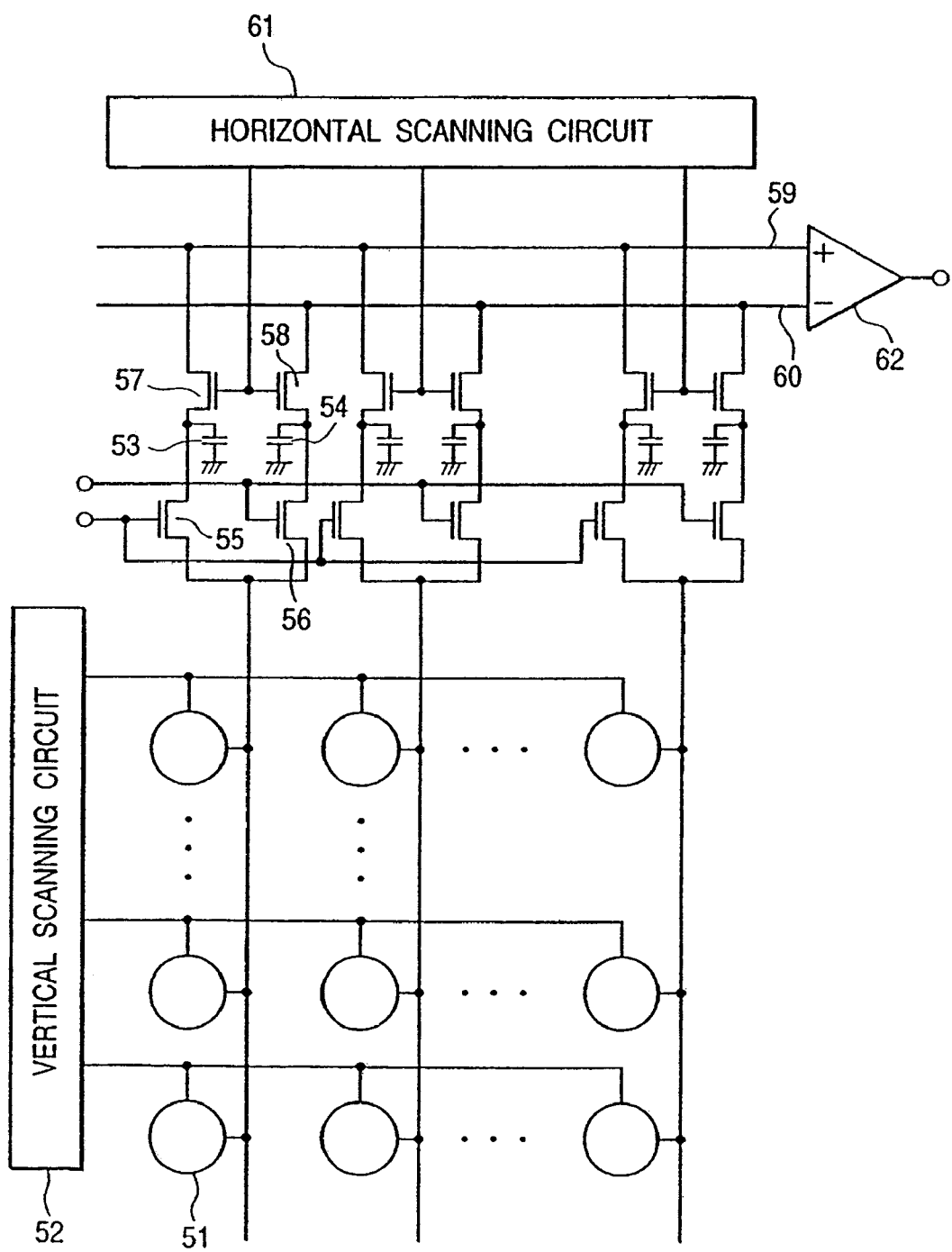
FIG. 3 is a circuit diagram of a photoelectric conversion unit with a conventional noise eliminating function.
Figure 4:
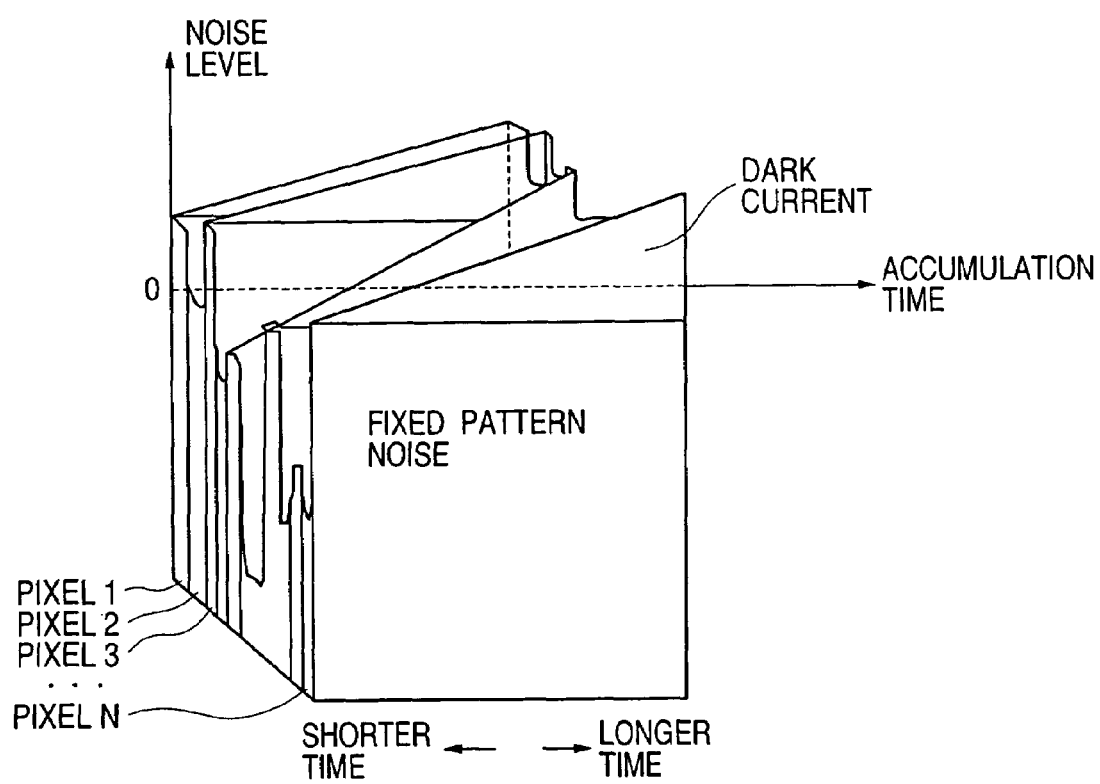
FIG. 4 is a schematic diagram showing a relation between fixed pattern noises, dark currents and accumulation time of pixels, according to an embodiment of the invention.
Figure 6A:
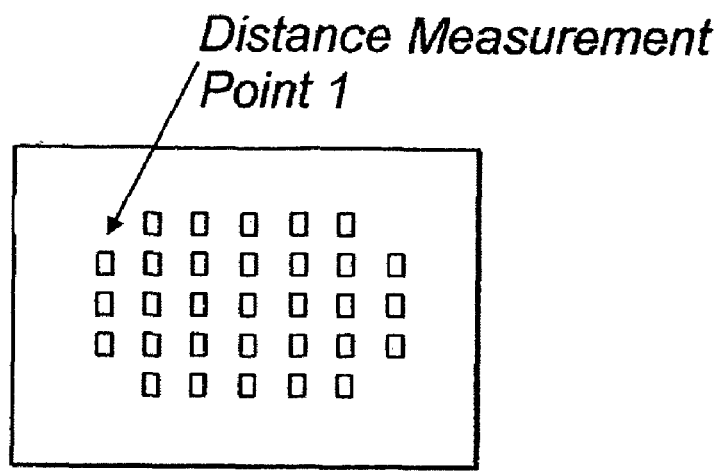
FIGS. 6A, 6B and 6C are diagrams showing distance measurement areas and pixel layout of a sensor using an area AF.
Figure 6B:
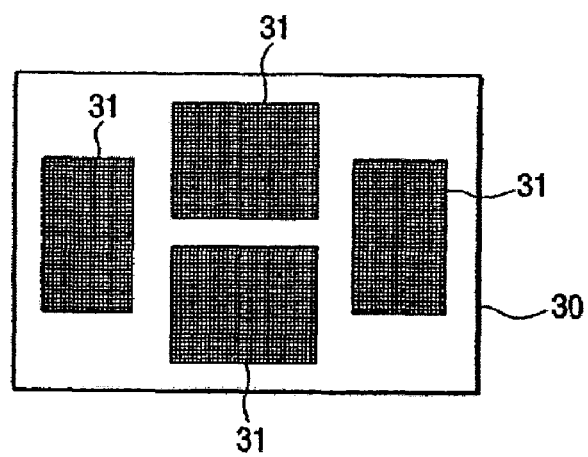
Figure 6C:
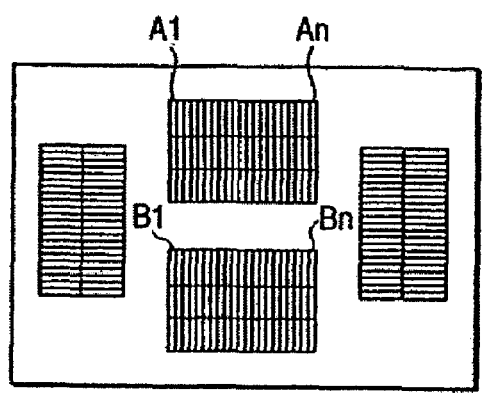

Area AF such as illustrated in FIGS. 6A to 6C is prevailing in order to broaden a focus area on an image pickup screen of an autofocusing camera. A conventional photoelectric conversion unit 70 shown in FIGS. 7A to 7C uses a plurality of line sensors 71 with pixels disposed linearly. A photoelectric conversion unit 30 shown in FIGS. 6A to 6C using area AF uses area sensors 31 with dense pixel trains disposed in each area, so that a broad area on an image pickup area can be focused. In this embodiment, the photoelectric conversion unit uses area sensors having a plurality of inversion amplification type pixels disposed in each area as disclosed in Japanese Patent Application Laid-Open No. 10-190038. This area sensor 31 has a number of pixels on one chip larger than that of a conventional line sensor. Therefore, a variation in levels of fixed pattern noises of pixels is likely to become large, because of various restrictions on the manufacture processes of a photoelectric conversion chip. As seen from a comparison between FIGS. 1 and 4, and 2 and 5, the variation of fixed pattern noises becomes larger than that of a conventional photoelectric conversion unit, for the following reasons.

Figure 7A:
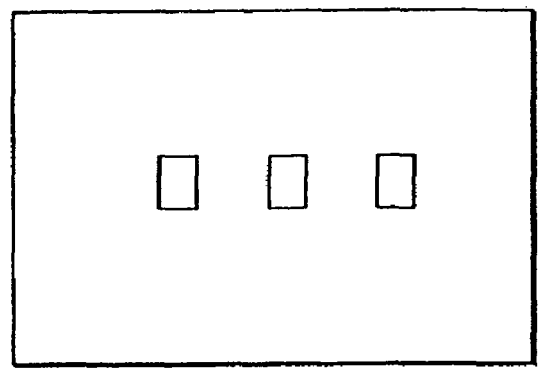
FIGS. 7A, 7B and 7C are diagrams showing distance measurement areas and pixel layout of a sensor using a conventional multi-point (three points) AF.
Figure 7B:
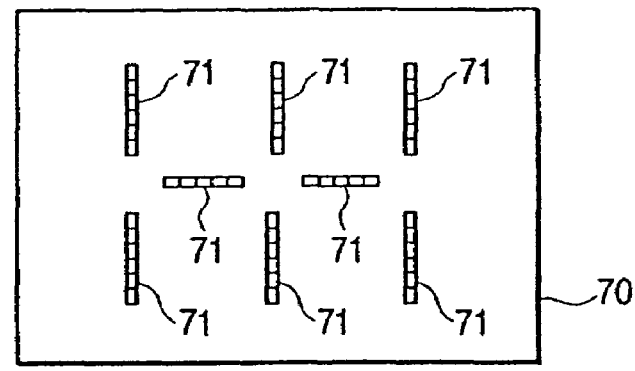
Figure 7C:
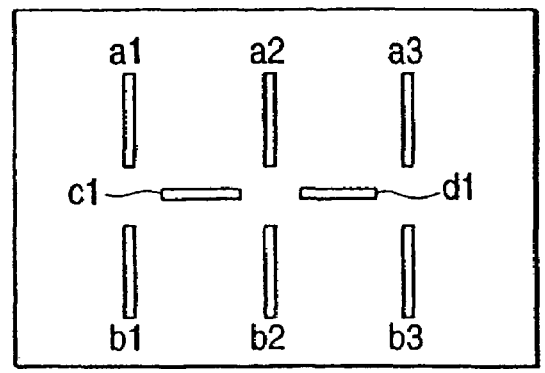

With reference to FIGS. 6A to 6C and FIGS. 7A to 7C, the area AF sensor of this embodiment is compared to a conventional three-point AF sensor. The area AF uses a number of distance measurement areas such as shown in FIG. 6A, whereas the three-point AF has three distance measurement areas such as shown in FIG. 7A. FIGS. 6B and 7C show the layout of area sensors 31 and line sensors 71 and the layout of pixels. In FIG. 6B, pixels are disposed in a matrix pattern, whereas in FIG. 7B, pixels are disposed linearly. FIG. 7C shows the layout of distance measurement pixel trains. FIG. 6C shows a number of distance measurement pixel trains including n distance measurement pixel trains A1 to An corresponding to n distance measurement pixel trains B1 to Bn. In FIG. 7C, three distance measurement areas are formed including the center area and opposite side areas, the center area being constituted of four pixel trains a2, b2, c1 and d1, the side area being constituted of two pixel trains a1 and b1, and the other side area being constituted of two pixel trains a3 and b3.

When a subject image is focussed by a distance measurement optical system on the sensor, each pixel generates, through photoelectric conversion, electric charges corresponding in amount to the incident light amount. In this case, if the accumulation time (a time taken to complete photoelectric conversion after the sensor is reset) is set to the same value for all distance measurement pixel trains, and if the brightness of the subject image differs greatly at respective distance measurement areas, then the light amount during the accumulation time may become insufficient and the charge amount may become insufficient, or the light amount may become excessive and the charge may overflow from the memory. From this reason, the accumulation time is generally determined differently for each distance measurement pixel train. For example, in the sensor shown in FIG. 7A, if a white wall of a house in the sun is in the right distance measurement area and a black iron bar in the shade of a tree is in the left distance measurement area, the brightness in the right distance measurement area is greatly different from that in the left distance measurement area. In this case, therefore, an accumulation control circuit of the sensor controls to set the accumulation time for the pixel trains a3 and b3 in the right distance measurement area shorter and the accumulation time for the pixel trains a1 and b1 in the left distance measurement area longer. The accumulation control circuit monitors a difference between the maximum and minimum potentials of pixels in each pixel train, and when the difference exceeds a predetermined value, the accumulation control circuit issues an accumulation completion signal. Alternatively, if a longest accumulation time comes, the accumulation is stopped.

An accumulation time can be measured from a difference between the time when an accumulation start signal is issued to the AF sensor and the time when the accumulation completion signal is issued, by using the timer function of a microprocessor usually connected to the AF sensor.

In a conventional photoelectric conversion unit, an accumulation completion signal is output to each distance measurement area. Namely, in the sensor shown in FIG. 7C, an accumulation control circuit is provided for each of a pair (line sensor pair) of pixel trains a1 and b1, a pair of a2 and b2, a pair of a3 and b3 and a pair of c1 and d1. Four accumulation completion signal lines are connected from the four line sensor pairs to input ports of the microprocessor. The microprocessor can know from the accumulation completion signal arrived at a certain input port that the accumulation is completed at the pixel trains in the corresponding distance measurement area.

In the photoelectric conversion unit using the area AF, the number of accumulation completion signal lines extending from the accumulation control circuits of the distance measurement areas to the external increases as the number of distance measurement areas becomes large. With the conventional notification measure of accumulation completion, it is necessary to prepare accumulation control circuits and signal lines as many as the number proportional to the number of distance measurement areas. Since there are several tens or more of the distance measurement areas, the number of ports of the microprocessor and the mount area of lines between the sensor and microcomputer are not suitable for a focus detector used with a compact camera. In view of this, in the embodiment area AF, the accumulation control circuit scans all the pixel trains at high speed. If there is a pixel train whose accumulation was completed, the accumulation control circuit stores the pixel train number and issues an accumulation completion signal to the microcomputer which in turn inquires the accumulation completion pixel train number to the area sensor. In response this, the accumulation control circuit returns the information on the accumulation completion pixel train in the distance measurement area. Only one accumulation control circuit is therefore sufficient and only one accumulation completion signal line is used. However, since it is necessary to scan a large number of pixel trains, the control circuit disposed adjacent to pixels is driven at high speed and may become a noise source.

Conventionally, pixel trains are not dense so that a fixed pattern noise eliminator circuit is mounted in a relatively large area with a sufficient area margin. In the area sensor using the area AF, an area of pixels occupies most of the area sensor area. Therefore, if other circuits are to be disposed occupying an area like a conventional line sensor, the size of the circuit becomes too large and the circuit is difficult to be mounted on a camera desired to be made compact. In order to solve this problem, the circuit is made finer and the circuit component is made more compact. As a result, the sensor manufacture allowance greatly influences the variation in levels of fixed pattern noises of pixels. If mass produced good sensors are selected which enter the allowable variation range of levels of fixed pattern noises of pixels same as the conventional range, the manufacture yield becomes very poor and the production cost becomes high because the variation in levels of fixed pattern noises in an area sensor is essentially larger than that of a line sensor. The cost of the focus detector unit therefore becomes high, and the cost of the camera using this focus detector unit also becomes high.

If the allowable variation range is broadened and sensors having large fixed pattern noises are used as good sensors in order to raise the manufacture yield, the following problems occur. Since such area sensors have a large output error, the reliability of distance measurement of a focus detector unit lowers and the performance of the focus detector unit is degraded.

These problems may be solved by incorporating a circuit structure which prevents noise interference. However, there is a trade-off between the suppression of fixed pattern noises by hardware and the compactness of the sensor. In making the sensor compact, there arise the problem of a smaller capacitance of the capacitor because of a reduced area of a photoelectric conversion pixel memory circuit with high integration, the problem of a layout of an accumulation control circuit and a memory circuit disposed near to each other, and other problems.

It is to be noted that the fixed pattern noises are constant for each pixel in terms of reproductivity.

In this embodiment, therefore, in order to solve the above problems, outputs of an area sensor of a photoelectric conversion unit, including a variation in fixed pattern noises, are corrected by using software on a microprocessor which functions as a computation unit. The fixed pattern noises have a constant output level for each pixel. Therefore, when the microprocessor reads a pixel output of the area sensor, the microprocessor corrects this pixel output by using a fixed pattern noise output level of the pixel stored in advance in a memory, and uses the corrected pixel output for distance measurement. Therefore, even an area sensor having a larger variation in fixed pattern noise levels than a line sensor can be used as a good sensor without judging it as a defect sensor. The manufacture yield can thus be prevented from being lowered.

Correcting the fixed pattern noises is generally associated with correcting the dark current. However, the level of the fixed pattern noises is very different from the variation in the dark current. Therefore, correcting at the same time both the fixed pattern noises and dark current is not preferable in terms of correction precision and correction range.

In this embodiment, therefore, correcting the dark noise of each pixel is performed independently from correcting the fixed pattern noises.

For such the correction, correction data is stored in advance in a non-volatile memory by performing the following processes.

1) A pixel output is read in the state that light is not incident upon a photoelectric conversion unit, to measure fixed pattern noise components of each pixel.

2) A relation between an accumulation time and a pixel output is measured in the state that light is not incident upon the photoelectric conversion unit, and the dark current components of each pixel is calculated from the pixel output subtracted by the fixed pattern noise components, by referring to the relation between the accumulation time and pixel output.

The above processes are executed for each pixel to generate fixed pattern noise correction information and dark current correction information specific to each pixel, and the correction information is stored in a memory of a controller unit combined with the photoelectric conversion unit.

In order to utilize a pixel output of the photoelectric conversion unit, the focus detector unit processes this pixel output by referring to a correspondence between the pixel and accumulation time. The fixed pattern noise components are first obtained from the correction information and subtracted from the pixel output. Then, by referring to the relation between the accumulation time and dark current, the dark current components are obtained and subtracted from the pixel output. With these processes, a precision of the output data of the photoelectric conversion unit can be improved.

Embodiments of the invention will be described in detail.

First, the focus detector unit used by the embodiments will be described.

FIG. 8 is a block diagram showing the circuit structure of a single-lens reflex camera having an automatic focus detector unit.

Referring to FIG. 8, PRS is a control circuit of the camera, and, for example, a one-chip microcomputer having a CPU 32a (central processing unit), a ROM 32b, a RAM 32c, an EEPROM 32d, an A/D converter 32e and a timer TM 32f. This control circuit PRS performs a series of camera operations such as automatic exposure control, automatic focussing, and film feeding and taking-up, in accordance with a camera sequence program stored in ROM. To this end, the control circuit PRS communicates with peripheral circuits in the camera and controllers in a lens system (LNS), by using communication signals SO, SI, SCLK and communication select signals CLCM, CSDR and CDDR, to control the peripheral circuits (e.g., DDR a microcomputer) and a motion of lenses, and to acknowledge an A/D conversion input and an interruption input and receive pixel data. ROM can store control data for peripheral circuits as well as the sequence program. A flash memory is used as ROM in which data specific to respective circuits is stored to perform the operations in accordance with this data.

SO is a data signal output from the control circuit PRS to the photoelectric conversion unit SNS, SI is a data signal output from SNS to PRS, and SCLK is a synchronous signal for SO and SI.

A sensor drive circuit of the photoelectric conversion unit SNS for focus detection which unit being constituted of an area sensor 31, its control circuit and an external interface, is selected when the signal CSDR takes "H" and controlled by the control circuit PRS by using SO, SI and SCLK. A photoelectrically converted analog signal is supplied to an A/D conversion port of PRS via a VIDEO line. An interruption signal for accumulation completion is supplied to an interruption input port of PRS via a /TINTE line. An accumulation completion of the photoelectric conversion unit SNS of this embodiment occurs under the following conditions.

Pixels are disposed in area sensors SNS-1a to SNS-2b such as area AF shown in FIG. 6B. In this case, if distance measurement areas of the area AF are disposed in a layout such as shown in FIG. 6A, a layout of corresponding distance measurement pixel trains of a phase difference distance measurement type becomes as shown in FIG. 6C.

A subject image taken with a camera is projected via a distance measurement optical system upon an area sensor. Therefore, a difference of brightness on the whole area sensor is generally greater than the dynamic range of the sensor. The CMOS area sensor can issue an accumulation completion signal when an accumulation completion at each pixel train shown in FIG. 6C is detected. When accumulation at the pair of pixel trains A1 and B1 at distance measurement point 1, one of a number of distance measurement areas, is completed, a pixel train A1, B1 accumulation completion flag is set in the photoelectric conversion unit SNS. The accumulation completion signal is sent via the /TINTE line to PRS. Upon reception of the accumulation completion signal from SNS, PRS transmits a command to SNS to make SNS send back accumulation flag information, and judges from the flag state the accumulation completion pixel trains. PRS controls SNS to output the photoelectrically converted data of the pixel trains via the VIDEO line. The control circuit PRS receives from the A/D conversion port the light amount analog value of the subject image formed on each pixel of the area sensor, performs the correction process for the pixel value, and thereafter performs a predetermined focus detection calculation to know a de-focus amount of the taking lens. The software sequence of this control will be later described.

Next, the automatic focussing of this camera constructed as above will be described with reference to flow charts.

Figure 14:
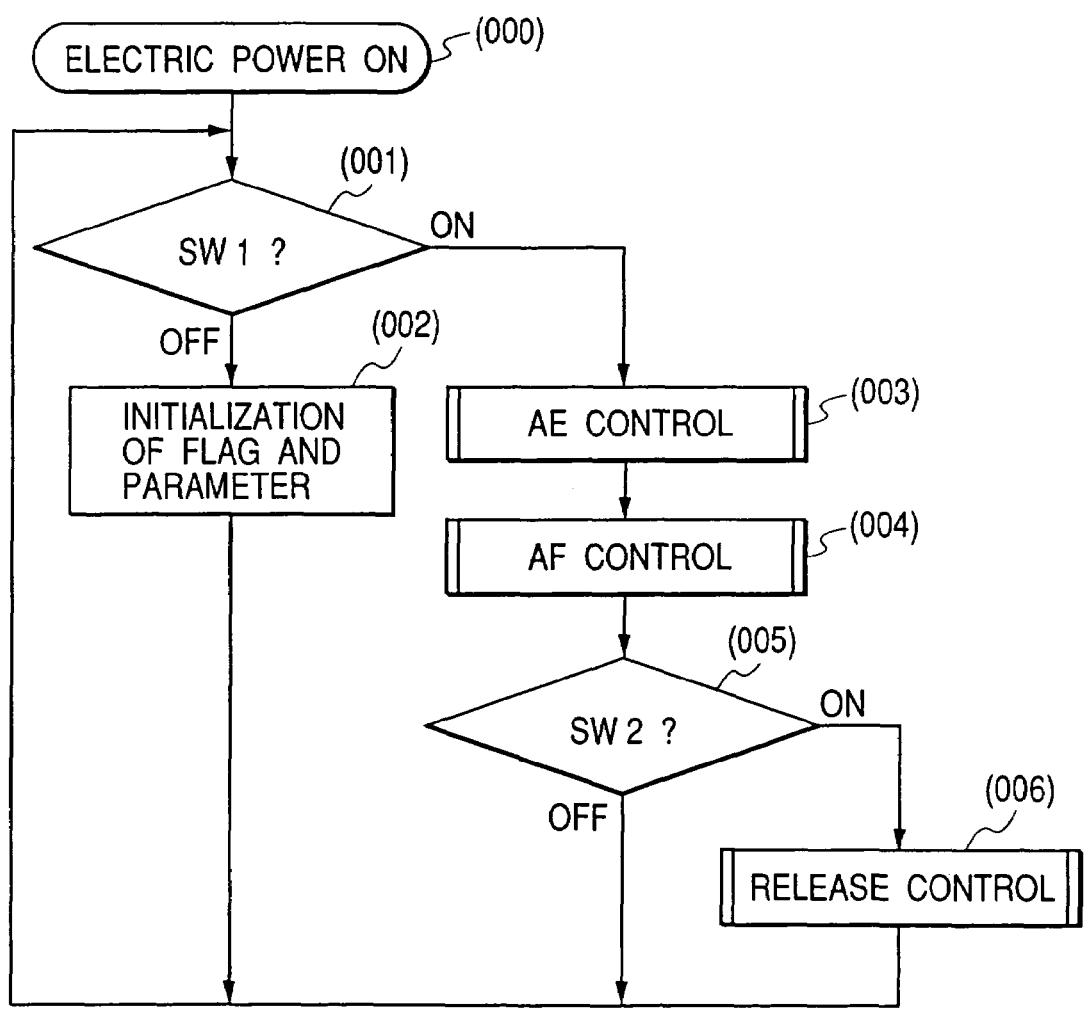
FIG. 14 is a flow chart illustrating a whole operation sequence of the camera.

When a power is supplied to the circuit shown in FIG. 8, the control circuit PRS starts operating first from Step (000) shown in FIG. 14. At Step (000) the state of a switch SW1 which is turned on by a first stage depression of a release button, is checked. If off, the flow advances to Step (002) whereat necessary flags and variables are initialized. Thereafter, the flow returns to Step (001) to check whether the switch SW1 is turned on.

If the switch SW1 is on at Step (001), the flow advances to Step (003) to start the camera operation.

At Step (003), a sub-routine "AE control" is executed to perform photometry, state detection and display of various switches, and the like. After the sub-routine "AE control" is completed, the flow advances to Step (004).

At Step (004) a sub-routine "AF control" is executed to perform sensor accumulation, focus detection calculation, and lens driving automatic focussing. After the sub-routine "AF control" is completed, the flow returns to Step (001) whereat Steps (003) and (004) are repeated until the switch SW1 is turned off.

While Steps (003) and (004) are repeated, the control circuit PRS checks the state of a switch SW2 (005) which is turned on by the second stage depression of the release button. If the switch SW2 turns on, the shutter control process is immediately performed to enter the photographing operation in accordance with the operation mode preset by an unrepresented setting mechanism (006), or the photographing operation is performed after an in-focus state is realized by the completion of the sub-routine "AF control". The details thereof are not described in this embodiment.

Generally, after the photographing operation is completed, the film is wound on for the next photographing operation. After the film feeding operation is completed, the camera enters the standby state for the next frame photographing. At this time, the flow returns to Step (001) to continue the above operations.

Figure 15:
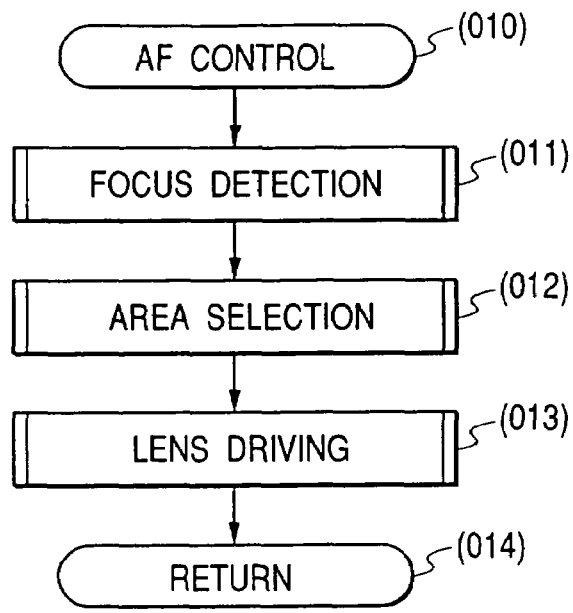
FIG. 15 is a flow chart illustrating an AF control sub-routine.

FIG. 15 is a flow chart illustrating the sub-routine "AF control" at Step (004).

When the sub-routine "AF control" is called, the AF control is executed starting from Step (010) to follow Steps (011) to (014).

At Step (011) a sub-routine "focus detection" is executed to perform a focus detection operation including accumulation, read of pixel data of an image in the sensor and focus detection calculation (the details will be later given).

At the next Step (012), a sub-routine "area selection" is executed to select a distance measurement area whose de-focus amount is to be used. In this embodiment, all distance measurement areas are selected, i.e., an automatic selection is performed. By depressing distance measurement area setting switches SWS shown in FIG. 8, a desired distance measurement area or areas can be selected. Since the viewpoint of a photographer can be detected by an unrepresented viewpoint input unit, the distance measurement area can be selected in accordance with the viewpoint of the photographer. The details of the viewpoint input are not given in this embodiment.

At Step (013) a sub-routine "lens driving" is executed to drive the lens in accordance with the de-focus amount of the distance measurement area selected at Step (012) among de-focus amounts detected at Step (011) (the details will be given later).

After the lens is driven, at Step (014) the flow returns to the sub-routine "AF control".

Figure 16:
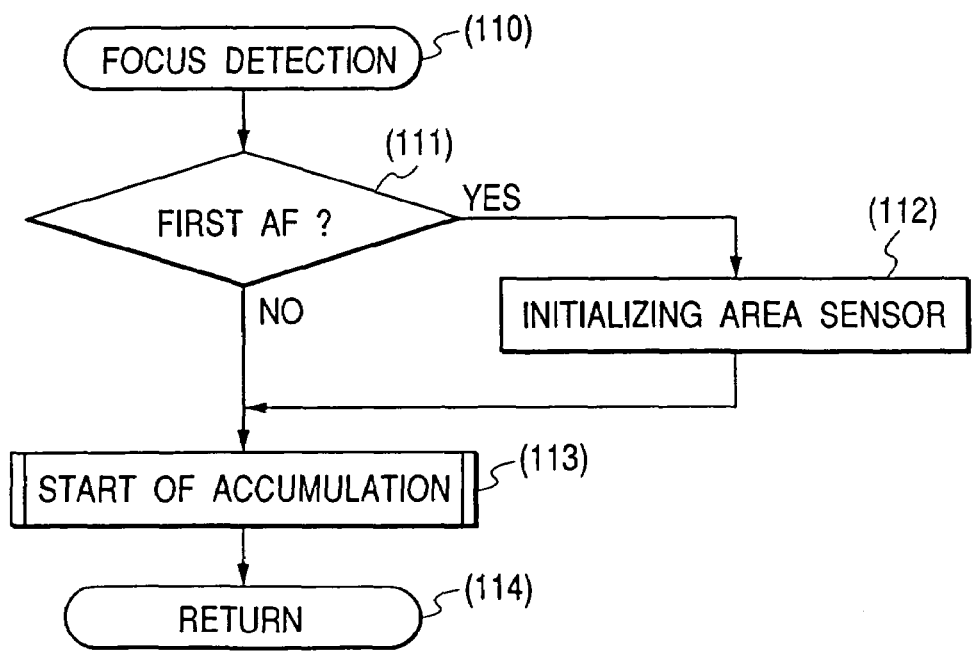
FIG. 16 is a flow chart illustrating a focus detection sub-routine.

FIG. 16 is a flow chart illustrating the sub-routine "focus detection" at Step (011).

When this sub-routine is called, the focus detection operation is executed starting from Step (110) to follow Steps (111) to (114).

At Step (111) it is checked whether the power is turned on and the AF control is executed first time. If first time, the flow advances to Step (112) whereat the area sensor is initialized.

Next, at Step (113) a sub-routine "accumulation start" is executed. This sub-routine starts the accumulation operation of the area sensor. More specifically, an accumulation start command is issued to the sensor SNS to start the accumulation operation, and at the same time, and the sensor SNS is set so that the control circuit PRS can recognize "accumulation completion" by the sensor accumulation completion signal /TINTE supplied from the sensor SNS.

The sub-routine "accumulation start" will be described.

Figure 9:
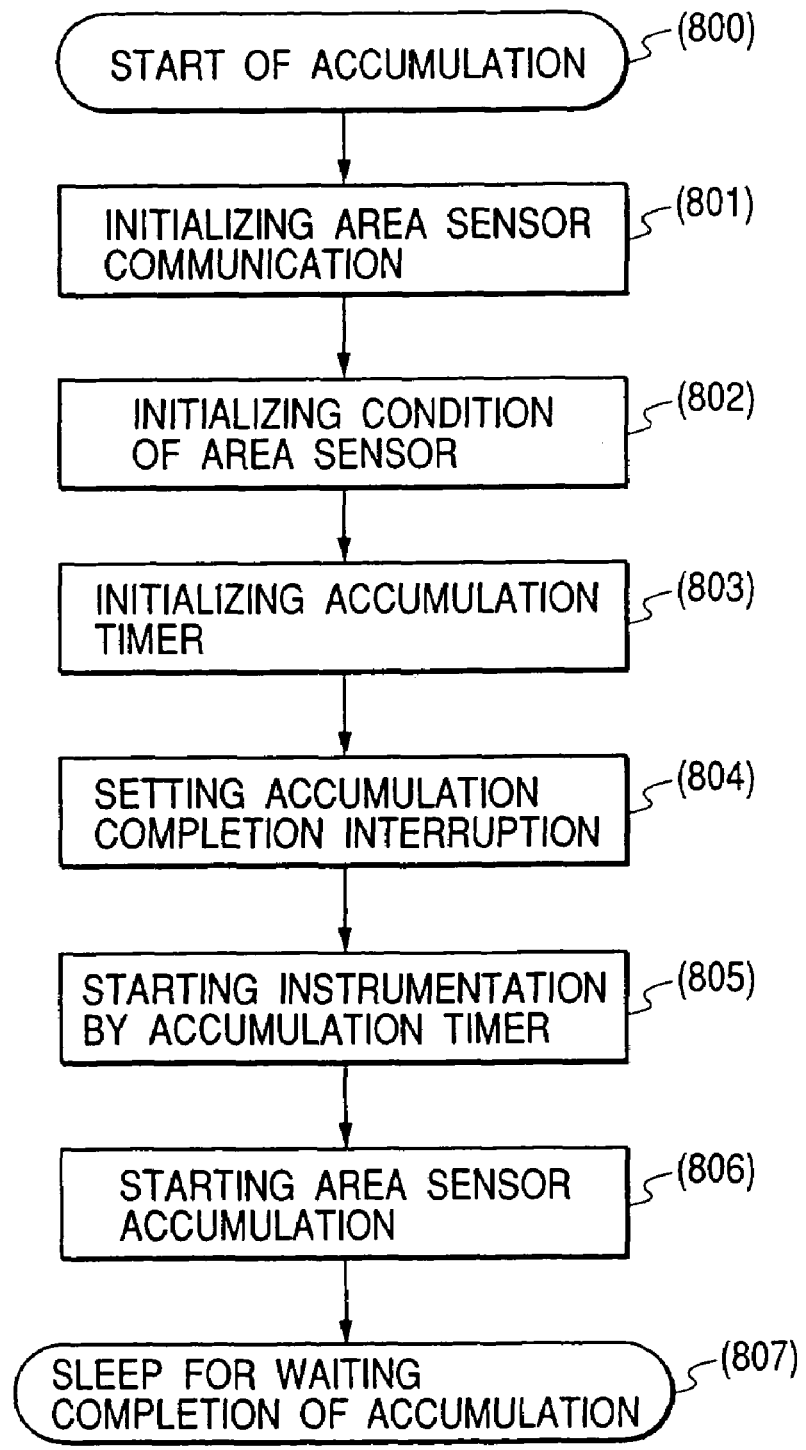
FIG. 9 is a flow chart illustrating an accumulation start process of the photoelectric conversion unit.

FIG. 9 is a flow chart illustrating the sub-routine "accumulation start". When the sub-routine "accumulation start" is activated starting from Step (800), area sensor communication is initialized at Step (801). Namely, the communication state with the photoelectric conversion unit SNS is initialized. With this initialization, the control circuit PRS can transmit control signals to the photoelectric conversion unit SNS and receive the photoelectric conversion results supplied from the photoelectric conversion unit SNS.

At Step (802) the conditions of photoelectric conversion unit SNS are initialized. At this Step, the photoelectric conversion unit SNS is reset, the gain and a photoelectric conversion result read mode are set, and other necessary operations are performed. The details of the initialization conditions and communication protocol for such setting are omitted in this embodiment.

At Step (803) the accumulation timer TM is initialized. Namely, a built-in timer of the control circuit PRS is initialized so that the built-in timer can be used properly as the accumulation time counting timer.

At Step (804) an accumulation completion interruption is set. With this accumulation completion interruption setting, the photoelectric conversion unit SNS can interrupt the control circuit PRS by using the accumulation completion signal /TINTE generated upon detection of the accumulation completion of a pixel train in each distance measurement area constituted of several tens pixels of the area sensor. In order for the control circuit PRS to respond to the interruption signal, an interruption permission, a priority order of accumulation completion interruptions and the like are set at this Step (804).

At Step (805), the accumulation timer starts counting. The timer initialized at Step (803) is activated to start counting. At Step (806) the area sensor starts accumulation. At this Step, the control circuit PRS is set so that it can acknowledge an accumulation completion interruption issued immediately after an accumulation start signal is sent to the area sensor. With this setting, the control circuit PRS can start the accumulation completion interruption process immediately when the area sensor SNS informs the accumulation completion.

After Step (806), the control circuit enters a sleep state at Step (807). The sleep state means a temporary suspension of the operation of the control circuit PRS until the sleep release conditions are met. The sleep release conditions are met when a sleep release signal is issued by the accumulation completion interruption process. When the sleep state at Step (807) is released, the process resumes from Step (901) next to the accumulation completion wait sleep Step 807 in FIG. 10. The sleep state is also released by a time-out error of an unrepresented time-out timer which error occurs when an accumulation completion takes an abnormally long time. This sleep state is also released by an abnormal operation such as the power-off during the operation and an insufficient battery capacity. However, the details of these are omitted because these are not relevant to the processes of the embodiment.

Figure 11:
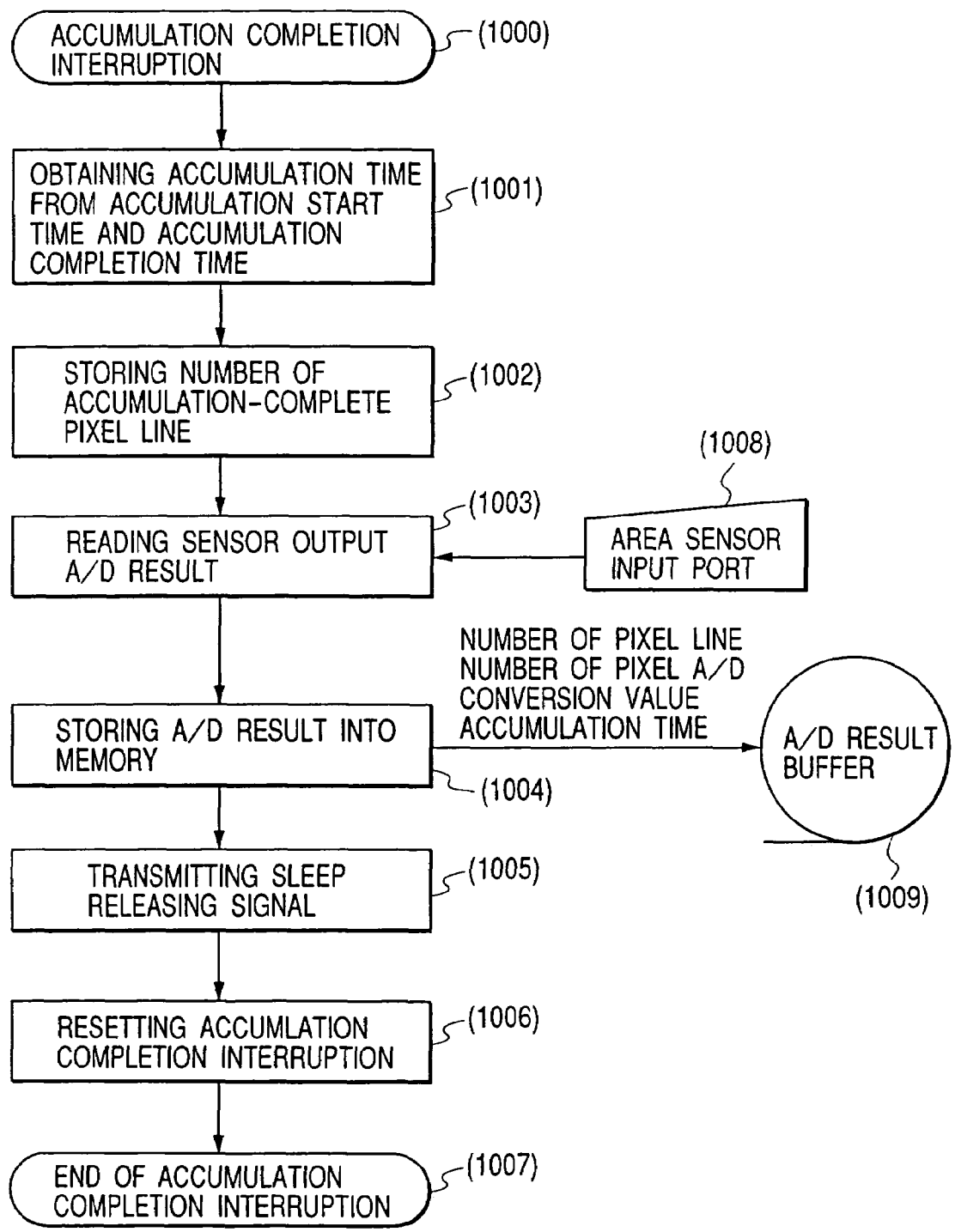
FIG. 11 is a flow chart illustrating an operation of an accumulation completion interruption handler activated upon an accumulation completion.

When the photoelectric conversion unit SNS which started accumulation becomes able to output the photoelectric conversion result, the photoelectric conversion unit SNS requests an interruption to the control circuit PRS by using the accumulation completion signal /TINTE. This is realized by setting the accumulation completion signal to "H". In response to this, the control circuit PRS calls the accumulation completion interruption routine shown in FIG. 11. The accumulation completion interruption routine will be described with reference to the flow chart of FIG. 11.

When the accumulation completion interruption process is activated by the accumulation completion signal, the process starts from Step (1000). At Step (1001) the time when the accumulation completion signal is issued is obtained from the accumulation time counting timer TM and accumulation time is obtained from a difference between the time when the accumulation completion signal is issued and the accumulation timer counting start time stored at Step (805).

At Step (1002) the accumulation completion pixel train number is acquired from the photoelectric conversion unit SNS through communications and stored in RAM. If accumulation completion occurs at the same time at a plurality of pixel trains, a plurality of accumulation completion pixel train numbers are transmitted.

At Step (1003) the analog signal value of the sensor output VIDEO is read from an area sensor input port (1008). If a plurality of accumulation completion pixel train numbers were received at Step (1002), the photoelectric conversion results are received from the photoelectric conversion unit SNS a plurality of times corresponding to the number of the received numbers and A/D converted. In order to make the area sensor output the analog value of the photoelectric conversion result of each pixel train, a photoelectric conversion result request and accumulation completion pixel train number are supplied to the photoelectric conversion unit SNS which in turn outputs the photoelectric conversion result via the VIDEO line.

At Step (1004) the pixel train number, pixel number, photoelectric conversion result A/D value obtained at Step (1003), and accumulation time are stored in an A/D result buffer (1009).

At Step (1005) a sleep release signal is sent to activate the process entered the sleep state at Step (807). However, until the interruption process is completed, the interruption process continues preferentially. Therefore, Step (1006) is continuously executed. At Step (1006) the accumulation completion interruption is set again for the preparation of the next accumulation completion interruption to be issued from the sensor SNS. The accumulation completion interruption is terminated at Step (1007).

Figure 10:
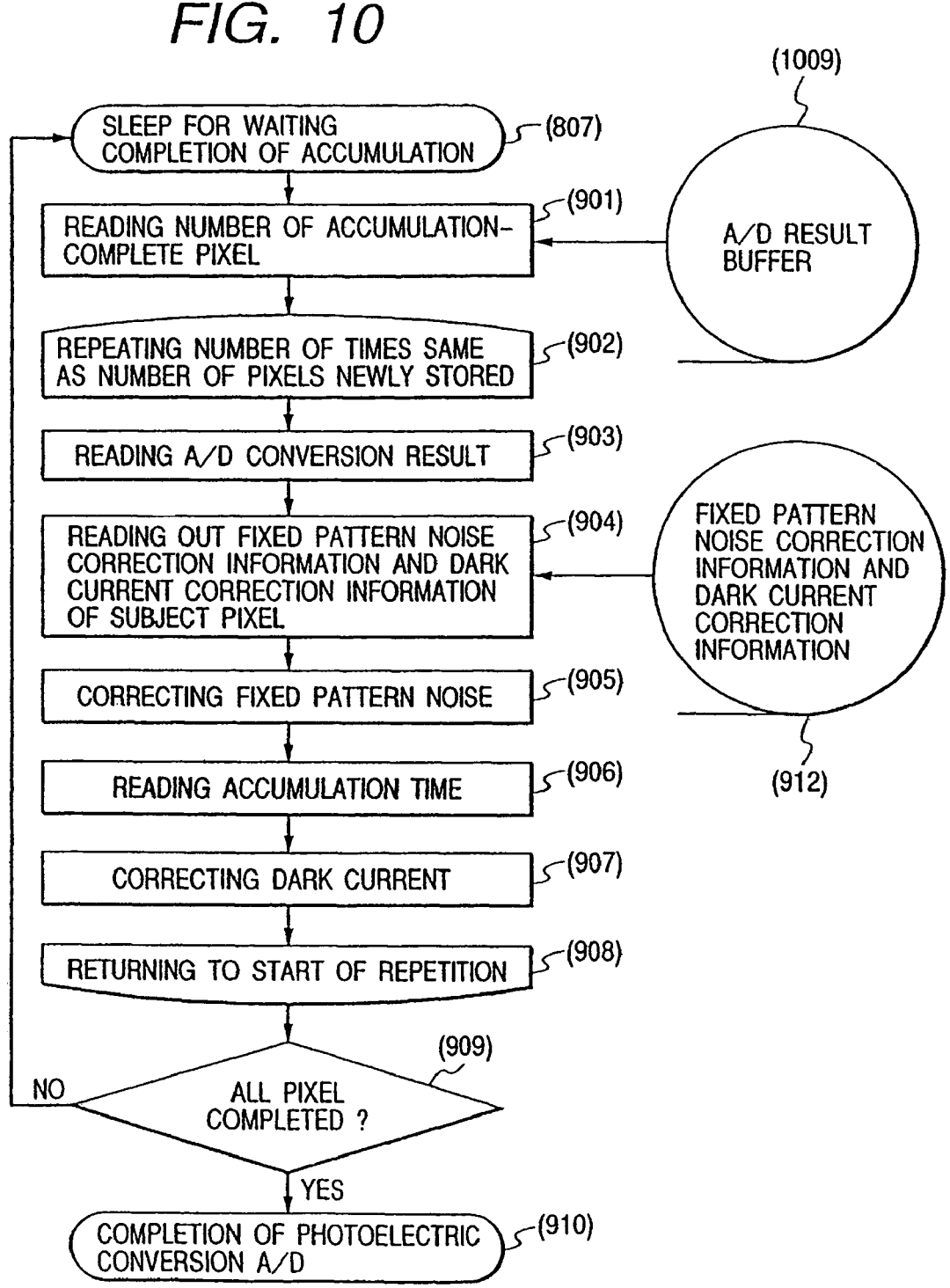
FIG. 10 is a flow chart illustrating a sleep loop for waiting for an accumulation completion while an output of the photoelectric conversion unit is A/D converted.

At this time, the accumulation completion wait sleep at Step (900) shown in FIG. 10 is released upon reception of the sleep release signal, and the flow advances to Step (901). At Step (901), the A/D conversion result is read from the A/D result buffer (1009). The A/D result buffer stores the pixel train number, A/D conversion value and accumulation time at Step (1004). In accordance with this information, the following processes are executed. This loop starts from Step (902). This loop is repeated the same times as the number of accumulation completion pixel trains newly stored in the A/D result buffer to process data of all the accumulation completion pixels obtained during the accumulation completion wait sleep.

At Step (903), the A/D conversion result corresponding to one of the accumulation completion pixel train numbers still not processed is read from the A/D result buffer.

At Step (904) the fixed pattern noise correction information and dark current correction information of each pixel of the pixel train is read from a fixed pattern noise correction information and dark current correction information database (912).

At Step (905) the A/D conversion results of the pixel train number and pixel number now under processing are corrected in accordance with the fixed pattern noise correction information. The corrected value AD2 is given by the following equation (1):

$$AD2[i,j]=AD[i,j]-FPN[i,j] \quad (1)$$

where AD is the A/D conversion result, FPN is the fixed pattern noise correction information, i is the pixel train number now under processing, and j is the pixel number of a pixel in the pixel train.

Next, at Step (906) the accumulation time is read from the A/D result buffer, and in accordance with this accumulation time the dark current correction is performed at Step (907). The corrected value AD3 is given by the following equation (2):

$$AD3[i,j]=AD2[i,j]-DK[i,j] \times TM[i] \quad (2)$$

where DK is the dark current correction information and TM is the accumulation time. j is incremented by 1 by an unrepresented loop, from 1 to the number m of pixels contained in the pixel train. The corrected values AD3 of all pixels in the pixel train are stored in the memory. The loop is terminated at Step (908) after all the new accumulation completion pixel trains are corrected by repeating the above processes.

After the loop is terminated, the flow advances to Step (909) whereat it is checked whether the A/D conversion results of all the pixel trains of the sensor have been corrected completely. If not, the flow returns to Step (900) to enter again the accumulation completion wait sleep, whereas if corrected completely, the flow advances to Step (910) to complete and terminate the photoelectric conversion A/D process.

The processes described above will be summarized.

An image projected upon the area sensor has a bright area and a dark area. Therefore, even if an accumulation of the pixel train in one of the distance measurement areas is completed, there is a pixel area in a dark area which still continues an accumulation. The A/D conversion results of the accumulation completion pixel trains identified by the accumulation completion pixel train numbers are sequentially read from the A/D conversion buffer to correct the fixed pattern noise and dark current. This process is repeated until the accumulation of all the pixel trains is completed.

The correction given by the equation (1) corresponds to the fixed pattern noise correction of this invention, and the correction given by the equation (2) corresponds to the dark current correction. The dark current correction is corrected by the correction amount proportional to the accumulation time.

The processes at Step (113) are completed as above, and then at Step (114) the focus detection process returns to the main routine.

Although Steps (900 to 910) shown in FIG. 10 are executed by PRS provided in the same apparatus as the photoelectric conversion unit SNS, these Steps shown in FIG. 10 may be executed by a discrete PRS separate from the photoelectric conversion SNS and connectable thereto when necessary.

A program realizing the processes at Steps (900 to 910) may be stored in a storage medium such as a CD-ROM and a semiconductor memory, and data may be processed by an apparatus including the photoelectric conversion unit SNS, a CPU and a ROM storing the fixed pattern noise correction information and dark current noise correction information, by inserting the storage medium into this apparatus. If a program capable of processing at high speed is developed at a later time, this program can be easily written in such a storage medium.

Thereafter, the photographing operation continues. The detailed description thereof is omitted.

Next, a method of determining the fixed pattern noise correction value and dark current correction value to be stored in ROM will be described.

Figure 12:
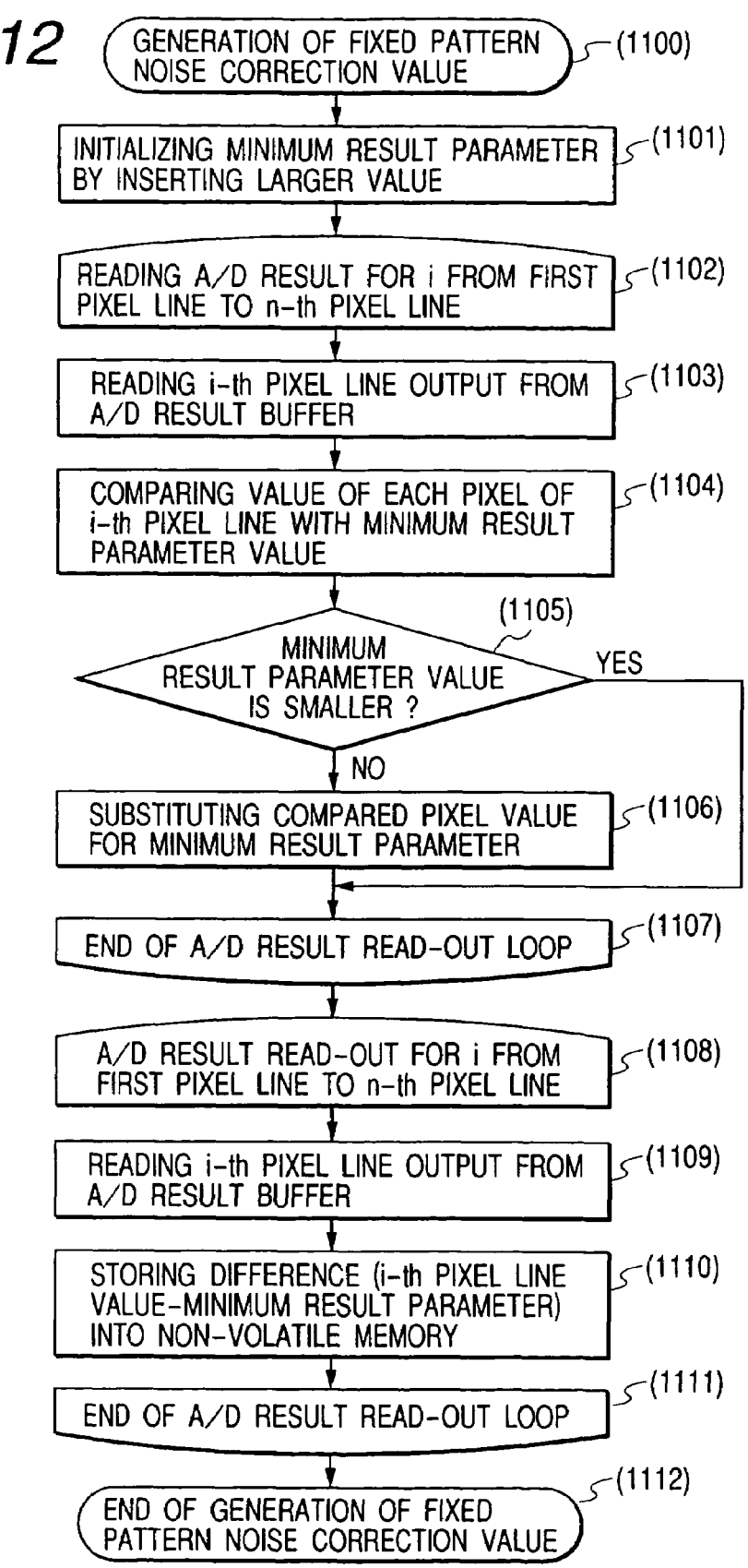
FIG. 12 is a flow chart illustrating an operation of determining a fixed pattern noise correction value.

FIG. 12 is a flow chart illustrating a method of determining a fixed pattern noise correction value. This method may be performed by the control circuit PRS, or the fixed pattern noise correction value may be determined by preparing a program different from the focus detection process and another control circuit.

In order not to duplicate the already described processes such as the A/D conversion control for receiving the photoelectric conversion result from the sensor SNS, the processes after the data before correction of the photoelectric conversion unit SNS is stored in the A/D result buffer (1009) will be described.

Prior to the setting of the accumulation completion interruption and a call of this sub-routine, the luminance of the light reception surface of the photoelectric conversion unit SNS is made uniform in order to measure the fixed pattern noise. For example, the light reception surface of the photoelectric conversion unit SNS is completely shielded from light to establish the black condition. The following processes are executed under the black condition of the photoelectric conversion unit SNS. The accumulation is completed not upon reception of the interruption /TINTE, but upon a time-out of a timer which counts up in a short time such as about 1 ms.

First, the sub-routine of determining the fixed pattern noise correction value is activated at Step (1100). Then, at Step (1101) a minimum result parameter value is initialized. This minimum result parameter value is compared with a minimum fixed pattern noise value at a later process. Therefore, this value is initialized to a value at least larger than the maximum level of the fixed pattern noise obtainable from the photoelectric conversion unit SNS.

At Step (1102) the A/D conversion result loop starts. This loop is repeated same n times as the number of the distance measurement pixel trains of the AF sensor.

The repetition variable i is first set to 1 and thereafter incremented by 1 each time a loop is completed. The repetition variable i is the number of the pixel train from which the fixed pattern noise correction value is measured.

At Step (1103) an output of the i-th pixel train is read from the A/D result buffer. Since each pixel train has a plurality of pixels, the outputs of these pixels are sequentially read. At Step (1104) the minimum result parameter is compared with the photoelectric conversion result value of each pixel of the i-th pixel train. If there is any pixel having a value smaller than the minimum result parameter at Step (1105), this value is set to the minimum result parameter at Step (1106). If the minimum result parameter is smaller than the photoelectric conversion value of each pixel, the flow skips to Step (1107) whereat first loop is terminated. This loop from Step (1102) to Step (1107) is repeated to the n-th pixel train.

After this loop is completed, next a loop from Step (1108) is performed for i=1 to i=n with an increment of 1.

At Step (1109), outputs of pixels of the i-th pixel train are sequentially read again from the A/D result buffer. At Step (1110) the minimum result parameter is subtracted from the photoelectric conversion value of each pixel, and this subtraction result value is stored in the fixed pattern noise correction information and dark current correction information database (912) made of a non-volatile memory. The non-volatile memory may be an EEPROM, a flash memory or the like. The subtraction result value may be output in an external storage device and then stored in a ROM to make the database (912).

At Step (1111) one loop is terminated. This loop from Step (1108) to Step (1111) is repeated to the n-th pixel train. After all the pixel trains are completely processed, the flow advances to Step (1112) to terminate the sub-routine of determining the fixed pattern noise correction value.

Figure 13:
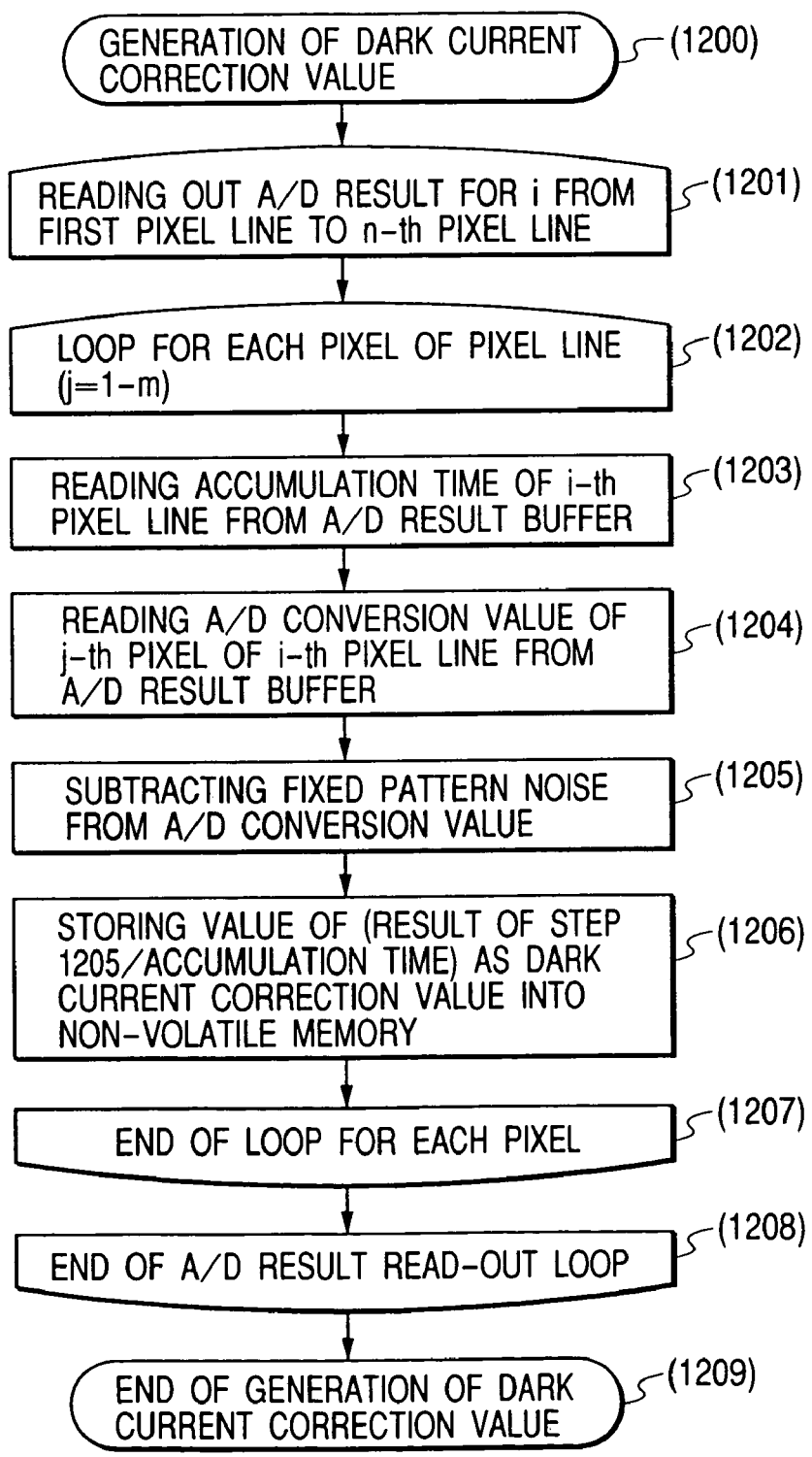
FIG. 13 is a flow chart illustrating an operation of determining a dark current correction value.

Next, a method of determining a dark current correction value will be described with reference to the flow chart of FIG. 13.

In determining the dark current correction value, the photoelectric conversion unit SNS is shielded from light to place it in the dark condition and measure only the dark current. Since no incidence light is applied to the photoelectric conversion unit SNS, an accumulation is not completed, and the A/D conversion to be activated the accumulation completion interruption process is impossible. Therefore, instead of the interruption signal via the /TINTE line for calling the accumulation completion interruption process, a timer interruption is used to unconditionally read the photoelectric conversion result after a predetermined accumulation time into the A/D result buffer. The following processes assume that the A/D conversion dark current is already stored in the A/D result buffer, similar to the fixed pattern noise correction value determining sub-routine.

After Step (1200) a loop from i=1 to i=n with an increment of 1 starts from Step (1201), and a loop from j=1 to j=m with an increment of 1 starts from Step (1202). A value n is the number of pixel trains of the sensor SNS 1a-1b included in the photoelectric conversion unit, and m is the number of pixels in one pixel train. At Step (1203) the accumulation time for the i-th pixel train is read from the A/D result buffer. At Step (1204) the A/D conversion value of the j-th pixel of the i-th pixel train is read. At Step (1205) the fixed pattern noise correction value of a corresponding pixel of the i-th pixel train read from the database (912) is subtracted from the read A/D conversion value. At Step (1206) the subtraction result value calculated at Step (1205) is divided by the accumulation time, and this division result value is stored in the database (912). Similar to the fixed pattern noise correction value determining process, this database may be an EEPROM, a flash memory or the like. The division result value may be output in an external storage device and then stored in a ROM to make the database (912), instead of writing directly into a memory.

Step (1207) is the last Step of the loop starting from Step (1202), and Step (1208) is the last Step of the loop starting from Step (1201). After the m-th pixel, the flow returns to Step (1202), and after the n-pixel train, the flow returns to Step (1202), to thereby repeat the loops. After the n-th pixel train is processed, the flow advances to Step (1209) to terminate the dark current correction value determining process.

In the embodiment described above, the photoelectric conversion unit SNS 30 corresponds to a photoelectric conversion unit, the area sensor 31 corresponds to an area sensor unit, and the control circuit PRS 32 corresponds to a noise correction means. Noise information corresponds to the fixed pattern noise correction value and dark current correction value, noise information dependent upon the accumulation time corresponds to the dark current correction value, and noise information independent from the accumulation time corresponds to the fixed pattern noise correction value.

In the embodiment described above, the fixed pattern noise correction value is determined through A/D conversion of each pixel output in a very short accumulation time of about 1 ms under the dark condition of the photoelectric conversion unit SNS. The dark current correction value is determined through A/D conversion of each pixel output in a predetermined accumulation time. This A/D conversion value is subtracted by the fixed pattern noise correction value, and the subtraction result value is divided by the accumulation time. The invention is not limited only to the above embodiment, but the following processes may also be used.

The A/D conversion values at two different accumulation times are first obtained under the black condition of photoelectric conversion unit SNS. Since the two different accumulation times and corresponding dark currents are known, the dark current value in a short accumulation time of about 1 ms, i.e., the fixed pattern noise value, can be calculated through extrapolation of two different accumulation times. The dark current correction value can be calculated thereafter by the similar method to that described earlier. In this case, the noise correction value corresponds to two or more dark current correction values.

Also in the above embodiment, the dark current correction value and fixed pattern noise correction value are first stored in the memory. Without using the memory, the dark current correction values and fixed pattern correction values of each field may be calculated in real time to process pixel data.

Also in the above embodiment, noises are eliminated for an AF signal of the photoelectric conversion unit using area AF. A MOS type image pickup device or the like may be used as the photoelectric conversion unit SNS 30 shown in FIG. 8 and the image pickup signal of a subject may be processed by the noise elimination method of this embodiment. Namely, the photoelectric conversion unit 30 using area AF may be other photoelectric conversion units capable of converting an optical signal into an electrical signal.

Also in the above embodiment, although a plurality of pixels are used, only a single pixel may be used to obtain a correct dark current value dependent upon the accumulation time and hence a correct noise elimination, because the dark current values at least two accumulation times are used.

As described so far, according to the embodiment, since noises of a pixel signal can be corrected, a highly precise signal can be obtained.

By eliminating noises by software of a microcomputer, noise correction can be made flexible.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
   a read-out unit which reads out a photoelectric conversion signal accumulated in a pixel during a first accumulation duration, wherein the photoelectric conversion signal includes a first noise component;
   an operation unit which calculates a noise correction value corresponding to the first noise component by using a correction value corresponding to a second noise component accumulated in the pixel during a second accumulation duration, and by using a correction value corresponding to a third noise component accumulated in the pixel during a third accumulation duration, wherein said noise correction value is calculated on the basis of changes in the first, second and third accumulation durations, and changes between the first, second and third noise components accumulated in the pixel, and wherein the first, second and third accumulation durations are different from each other; and
   a correction unit correcting the photoelectric conversion signal using the correction value corresponding to the first noise component,
   wherein said read-out unit reads out a photoelectric conversion signal accumulated in a pixel during a first accumulation duration in response to a sensor accumulation completion signal from a sensor representing the pixel, and
   wherein said operation unit calculates a noise correction value corresponding to the first and second noise components by using correction values corresponding to second and third noise components accumulated in the pixel during second and third accumulation durations, which are both set by a timer independently of the sensor accumulation completion signal.

2. An image processing apparatus comprising:
   a read-out unit which reads out a photoelectric conversion signal accumulated in a pixel during a first accumulation duration, wherein the photoelectric conversion signal includes a first noise component;
   an operation unit which calculates a noise correction value corresponding to the first noise component by using a correction value corresponding to a second noise component accumulated in the pixel during a second accumulation duration, and by using a correction value corresponding to a third noise component accumulated in the pixel during a third accumulation duration, wherein said noise correction value is calculated on the basis of changes in the first, second and third accumulation durations, and changes between the first, second and third noise components accumulated in the pixel, and wherein the first, second and third accumulation durations are different from each other; and
   a correction unit correcting the photoelectric conversion signal using the correction value corresponding to the first noise component,
   wherein the second noise component comprises a fixed pattern noise component whose value is independent of the second accumulation duration and whose correction value is calculated from a value of the photoelectric conversion signal accumulated in the pixel during the second accumulation duration without modifying said value with a value of the second accumulation duration, and
   wherein the third noise component comprises a dark current noise component whose value is dependent upon the third accumulation duration and whose correction value calculated from a value of the photoelectric conversion signal accumulated in the pixel during the third accumulation duration by modifying the value of the photoelectric conversion signal accumulated in the pixel during the third accumulation duration using the value of the third accumulation duration.

3. An image processing apparatus according to claim 2,
   wherein said operation unit calculates the noise correction value corresponding to the first noise component by using:
   a fixed pattern noise correction value, $FPN[i,j]$ for the jth pixel in an ith pixel train, corresponding to a second noise component accumulated in the pixel during a second accumulation duration, and
   a dark current noise correction value corresponding to a third noise component accumulated in the pixel during a third accumulation duration, wherein the dark current noise correction value for the jth pixel of the ith pixel train is calculated by multiplying dark current correction information for the jth pixel of the ith pixel train, DK[i,j] by the third accumulation duration for the ith pixel train, TM[,I], wherein said noise correction value, AD3[i,j] for the jth pixel of the ith pixel train is computed by first subtracting the fixed pattern noise correction value for the jth pixel of the ith pixel train, FPN [i,j], from the value of the read out photoelectric conversion signal read by said read-out unit for the jth pixel in the ith pixel train to obtain a fixed-pattern-noise-corrected photoelectric conversion signal AD2[i,j], and then subtracting the product of the dark pattern noise correction information for the jth pixel of the ith pixel train, DK[i,j] and the third accumulation duration for the ith pixel train TM[i], from the fixed-pattern-noise-corrected photoelectric conversion signal AD2[i,j] using the following two equations:

$$AD2[i, j] = AD[i, j] - FPN[i, j],$$
$$AD3[i, j] = AD2[i, j] - DK[i, j] \times TM[i].$$

4. An image processing apparatus comprising:

a read-out unit which reads out a photoelectric conversion signal accumulated in a pixel during a first accumulation duration, wherein the photoelectric conversion signal includes a first noise component;

an operation unit which calculates a noise correction value corresponding to the first noise component by using a correction value corresponding to fixed pattern noise of a plurality of pixels, and by using a correction value corresponding to a second noise component accumulated in the pixel during a second accumulation duration, wherein said noise correction value is calculated on the basis of changes between the first and second accumulation durations, and changes in the first and second noise components accumulated in the pixel and wherein the first and second accumulation durations are different from each other; and a correction unit correcting the photoelectric conversion signal using the correction value corresponding to the first noise component, wherein said read-out unit reads out a photoelectric conversion signal accumulated in a pixel during a first accumulation duration in response to a sensor accumulation completion signal from a sensor representing the pixel, and wherein said operation unit calculates a noise correction value corresponding to the first and second noise components by using a correction value corresponding to the second noise component accumulated in the pixel during second accumulation duration, which is set by a timer independently of the sensor accumulation completion signal.

5. An image processing apparatus comprising:

a read-out unit which reads out a photoelectric conversion signal accumulated in a pixel during a first accumulation duration, wherein the photoelectric conversion signal includes a first noise component;

an operation unit which calculates a noise correction value corresponding to the first noise component by using a correction value corresponding to fixed pattern noise of a plurality of pixels, and by using a correction value corresponding to a second noise component accumulated in the pixel during a second accumulation duration, wherein said noise correction value is calculated on the basis of changes between the first and second accumulation durations, and changes in the first and second noise components accumulated in the pixel and wherein the first and second accumulation durations are different from each other; and a correction unit correcting the photoelectric conversion signal using the correction value corresponding to the first noise component, wherein the fixed pattern noise has a value that is independent of the accumulation duration associated with its measurement, wherein the correction value corresponding to the fixed pattern noise is calculated from a value of the photoelectric conversion signal accumulated in the pixel during the accumulation duration associated with the measurement of the fixed pattern noise without modifying said value with a value of its associated accumulation duration, and wherein the second noise component comprises a dark current noise component whose value is dependent upon the second accumulation duration and whose correction value calculated from a value of the photoelectric conversion signal accumulated in the pixel during the second accumulation duration by modifying the value of the photoelectric conversion signal accumulated in the pixel during the second accumulation duration using the value of the second accumulation duration.

6. An image processing apparatus according to claim 5, wherein said operation unit calculates the noise correction value corresponding to the first noise component by using:

a fixed pattern noise correction value, FPN[i,j] for the jth pixel in an ith pixel train, which is accumulated in the pixel its associated accumulation duration, and a dark current noise correction value corresponding to the second noise component accumulated in the pixel during the second accumulation duration, wherein the dark current noise correction value for the jth pixel of the ith pixel train is calculated by multiplying dark current correction information for the jth pixel of the ith pixel train, DK[i,j] by the second accumulation duration for the ith pixel train, TM[,I], wherein said noise correction value, AD3[i,j] for the jth pixel of the ith pixel train is computed by first subtracting the fixed pattern noise correction value for the jth pixel of the ith pixel train, FPN [i,j], from the value of the read out photoelectric conversion signal read by said read-out unit for the jth pixel in the ith pixel train to obtain a fixed-pattern-noise-corrected photoelectric conversion signal AD2[i,j], and then subtracting the product of the dark pattern noise correction information for the jth pixel of the ith pixel train, DK [i,j] and the second accumulation duration for the ith pixel train TM[i], from the fixed-pattern-noise-corrected photoelectric conversion signal AD2[i,j] using the following two equations:

$$AD2[i, j] = AD[i, j] - FPN[i, j],$$
$$AD3[i, j] = AD2[i, j] - DK[i, j] \times TM[i].$$

* * * * *